United States Patent [19]
Benson

[11] 3,799,325
[45] Mar. 26, 1974

[54] FLEXIBLE CONVEYOR SYSTEM
[76] Inventor: William C. Benson, 101 Hollyhill Ln., Denton, Tex. 76201
[22] Filed: Sept. 25, 1972
[21] Appl. No.: 292,119

[52] U.S. Cl............................. 198/127 R, 198/109
[51] Int. Cl............................................ B65g 13/02
[58] Field of Search............... 198/109, 203, 127 R; 193/35 F

[56] References Cited
UNITED STATES PATENTS
3,291,283  12/1966  Keith ................................. 198/110
2,384,959  9/1945  Pearson ............................. 198/109 X
3,092,233  6/1963  Titchenal............................ 193/35 F FOREIGN PATENTS OR APPLICATIONS
152,470  11/1955  Sweden.......................... 198/127 R Primary Examiner—Edward A. Sroka
Attorney, Agent, or Firm—Richards, Harris & Medlock

[57] ABSTRACT

A flexible conveyor system includes a central power unit and a plurality of flexible conveyor units extending in opposite directions from the power unit. The power unit comprises a prime mover and a speed reducer system for supplying operating power to a longitudinal drive shaft. Each flexible conveyor unit comprises a flexible sheet which supports a plurality of powered roller assemblies having one or more idler roller assemblies therebetween. Each flexible conveyor unit further includes a flexible drive shaft which extends along the flexible sheet to drivingly interconnect the drive shaft of the power unit and the powered roller assemblies of the flexible conveyor unit.

The drive shafts of the power unit and the flexible conveyor units support a plurality of sheave members each of which is aligned with a powered roller assembly. Each sheave member comprises a central cylindrical portion and opposed conical portions which taper inwardly from the cylindrical portion toward the drive shaft. A wide, flat belt extends around the sheave member and the adjacent roller to form a driving connection therebetween. The belt engages one of the conical portions of its respective sheave member in accordance with the direction of rotation of the drive shaft.

20 Claims, 7 Drawing Figures

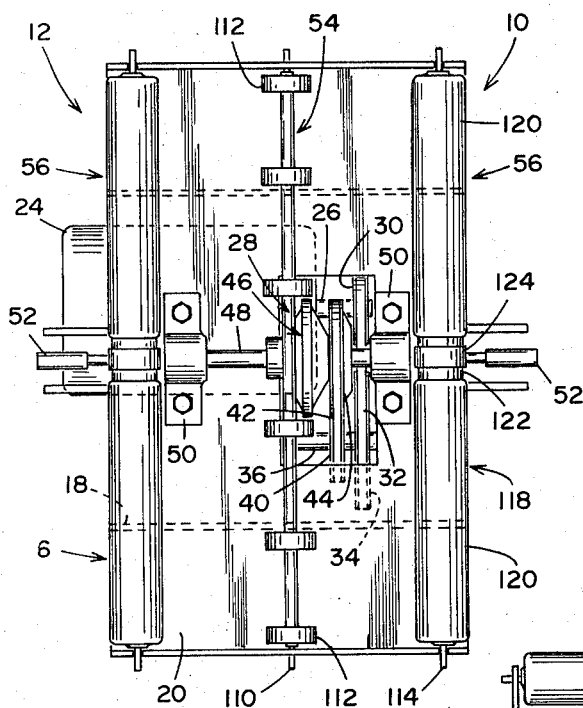
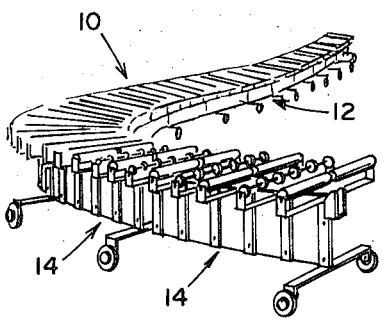
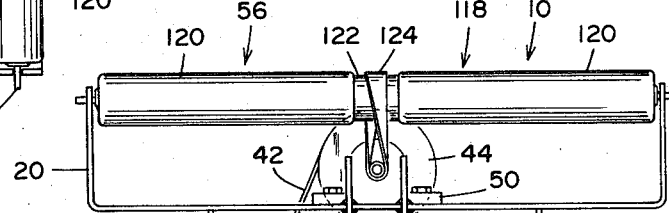
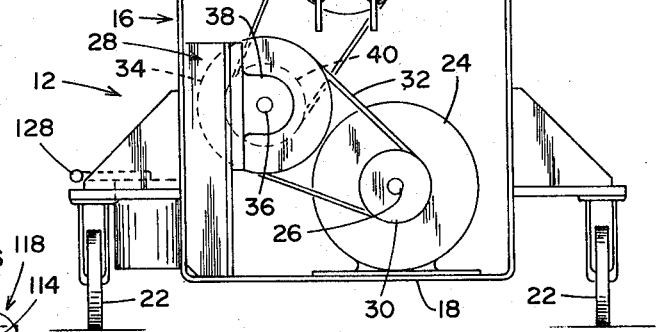
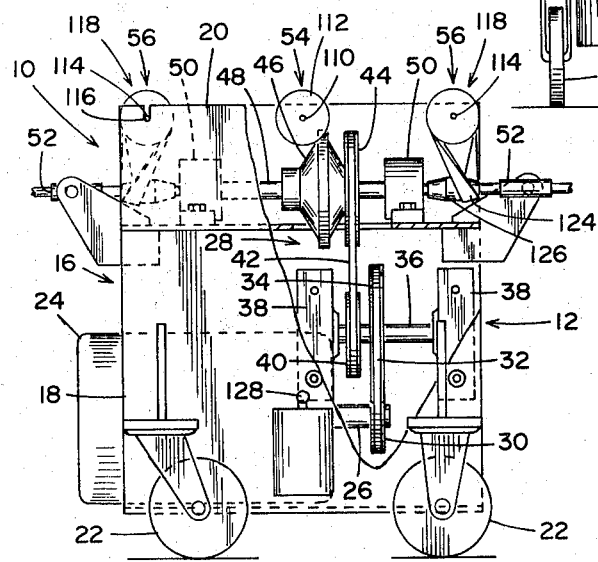

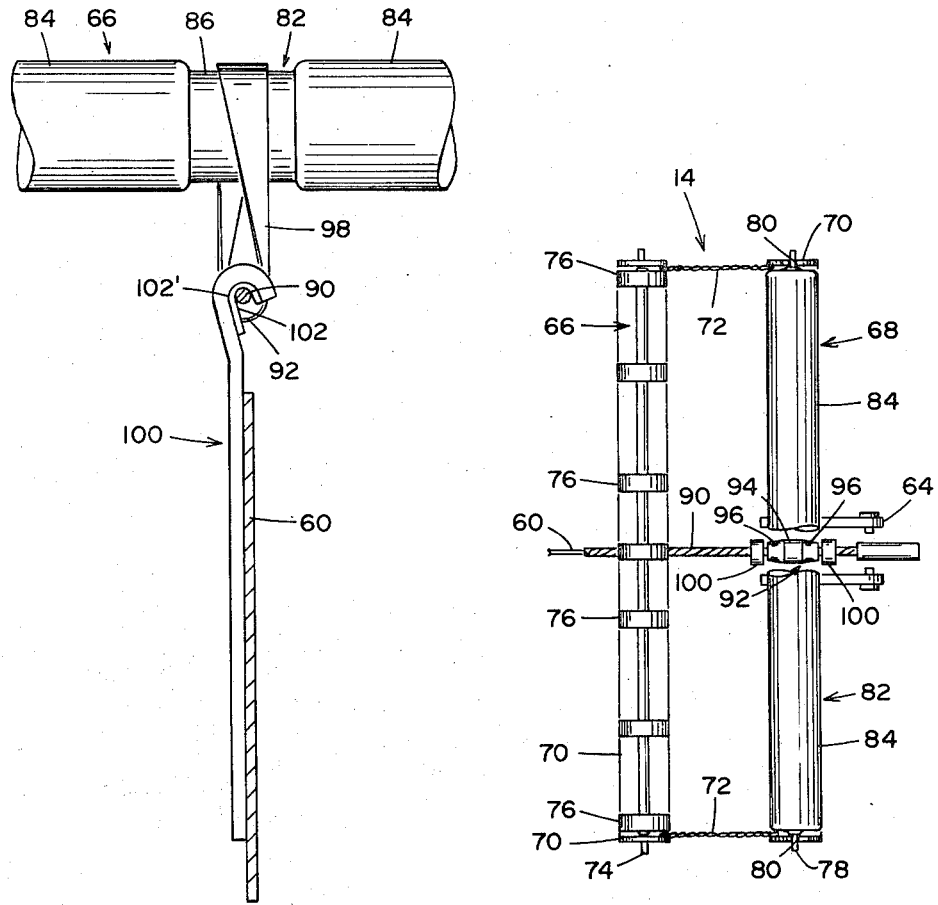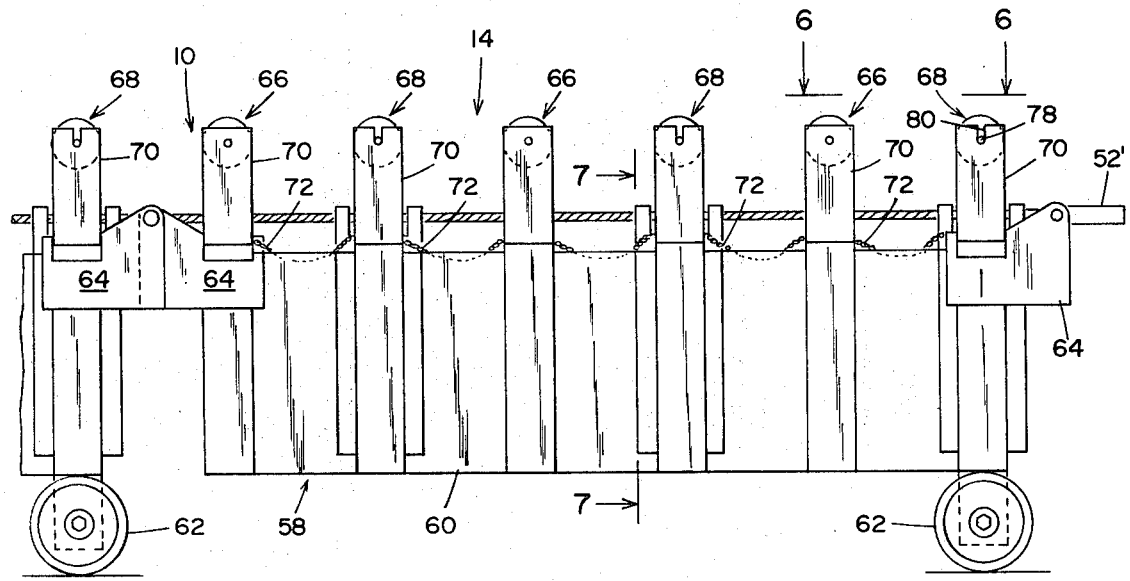

FLEXIBLE CONVEYOR SYSTEM

BACKGROUND AND SUMMARY OF THE INVENTION

This invention relates to a flexible conveyor system, and more particularly to a conveyor system adapted for use in various industrial and commercial applications, such as in and around warehouses, semitrailers, and the like.

U.S. Pat. No. 3,268,099, granted to Fortunato S. Ajero and William C. Benson on Aug. 23, 1966, discloses a flexible conveyor system which is especially adapted for use in moving articles into and out of aircraft through the cargo doors thereof. To this end the Ajero et al device comprises an extremely low profile conveyor having a power supply mechanism at one end, whereby the power supply mechanism can remain outside of the aircraft. The device comprises a series of relatively short, rigid sections which are hingedly interconnected to permit flexure of the conveyor. Power is transferred along the length of the conveyor by a drive shaft comprising solid sections which are interconnected by universal joints. Articles are transported on the device by a series of powered rollers each of which is connected to the drive shaft by an individual right-angle drive.

Although well-adapted for use in aircraft loading and unloading operations, the Ajero et al conveyor is not especially suited for use in more conventional industrial and commercial applications. Thus, several features of the invention render the device so prohibitively expensive as to deny its use in many applications. Also, the requirement that the power supply mechanism remain outside the aircraft dictates the necessity of transferring power along the entire length of the conveyor. As will be appreciated, this requirement necessitates either a marked increase in the size of the drive shaft components so as to provide sufficient strength to transfer the necessary power, or a reduction in the capacity of the unit. Finally, the extremely low profile configuration and other features of the Ajero et al invention are simply not necessary or desirable in many applications.

The present invention relates to a flexible conveyor system comprising an improvement over the Ajero et al device which is especially adapted for use in and around semitrailers, warehouses, etc., and in other industrial and commercial applications. In accordance with the broader aspects of the invention, a flexible conveyor system includes a power unit which is centrally disposed so as to reduce by approximately one-half the power transmission requirements of the system. Flexible conveyor units extend in opposite directions from the power unit and are hindgedly interconnected so that the conveyor system can be used on inclines, and the like. Each flexible conveyor unit comprises a vertically oriented flexible steel sheet which supports powered and idler roller assemblies. By this means the flexible conveyor system is adapted to transport articles in either direction over a conveyor course including curved portions wherein the radius of curvature is as small as 36 inches.

In accordance with more specific aspects of the invention, power is transmitted from the power unit to the powered roller assemblies of the flexible conveyor units by a flexible drive shaft. The flexible drive shaft is provided with a series of sheave members each positioned in alignment with one of the powered roller assemblies. The sheave members comprise central cylindrical portions and outer conical portions, and serve to connect the flexible drive shaft to the powered roller assemblies by means of wide, flat belts. The belts extend around the sheave members and around the rollers to form a driving connection therebetween, and ride on one of the conical sections of the sheave members depending on the direction of rotation of the flexible drive shaft. The rollers are supported in upwardly facing U-shaped journals, and hook-shaped bearing members are provided on each side of each sheave member on the flexible drive shaft. By this means the flexible shaft is located by the hook-shaped bearing members under the tension of the drive belts and replacement of the belts is facilitated.

DESCRIPTION OF THE DRAWINGS

A more complete understanding of the invention may be had by referring to the following Detailed Description when taken in conjunction with the accompanying Drawings, wherein:

FIG. 1 is a perspective view of a flexible conveyor system incorporating the invention;

FIG. 2 is a top view of a power unit comprising part of the flexible conveyor system shown in FIG. 1;

FIG. 3 is an end view of the power unit;

FIG. 4 is a side view of the power unit in which certain parts have been broken away more clearly to illustrate certain features of the invention;

FIG. 5 is a side view of a flexible conveyor unit comprising part of the flexible conveyor system shown in FIG. 1;

FIG. 6 is a top view of a portion of the flexible conveyor unit; and

FIG. 7 is a sectional view taken generally along the line 7—7 in FIG. 5.

DETAILED DESCRIPTION

Referring now to the Drawings, and particularly to FIG. 1 thereof, there is shown a flexible conveyor system 10 incorporating the invention. The flexible conveyor system 10 comprises a centrally disposed power unit 12 and a plurality of flexible conveyor units 14 extending in opposite directions from the power unit 12. By this means there is provided a flexible conveyor system that is highly useful in and around warehouses, semitrailers, etc. to transport packages and similar articles over a conveyor course which may include both inclined and curved portions.

The power unit 12 of the flexible conveyor system 10 is illustrated in FIGS. 2, 3 and 4. Referring particularly to FIG. 3, the power unit 12 comprises a frame 16 including a lower portion 18 and an upper portion 20. The lower portion 18 of the frame 16 is supported on four wheels 22 and in turn supports a prime mover 24. The prime mover 24 may comprise either an electric motor such as that illustrated in the Drawings, a hydraulic motor, or an internal combustion engine in order to meet the requirements of a particular application. In any event, the prime mover 24 functions to rotate an output shaft 26 at a predetermined speed.

The prime mover 24 is connected to the operating components of the flexible conveyor system 10 by means of a speed reducer system 28. Although any convenient type of speed reducer system 28 may be utilized in the practice of the invention, the use of a belt and pulley type speed reducer system such as that illustrated in the Drawings is preferred. In such a case the speed reducer system 28 includes a relatively small diameter pulley 30 secured to the output shaft 26 of the prime mover 24 and a belt 32 extending around the pulley 30 and around a relatively large diameter pulley 34.

The pulley 34 is secured to a jack shaft 36 which is rotatably supported on the frame 16 of the power unit 12 by means of a pair of pillow block bearings 38. A relatively small diameter pulley 40 is also secured to the jack shaft 36, and a belt 42 extends around the pulley 40 and around a relatively large diameter pulley 44. By this means the prime mover 24 functions to rotate the pulley 44 at a relatively low speed.

The pulley 44 of the speed reducer system 28 is connected to the input of a slip clutch 46. The output of the slip clutch 46 is in turn connected to a drive shaft 48 which extends longitudinally of the power unit 12. The function of the slip clutch 46 is to transfer operating power from the prime mover 24 to the drive shaft 48 and simultaneously to prevent damage to the prime mover 24, the flexible drive shafts of the flexible conveyor units 14, and the speed reducer system 28, should the flexible conveyor system 10 become jammed, etc.

The drive shaft 48 extends longitudinally of the power unit 12 of the flexible conveyor system and is supported on the upper portion 12 of the frame 16 of the power unit 12 by means of a pair of pillow block bearings 50. The drive shaft 48 extends to a pair of connectors 52 which are utilized to form driving connections between the power unit 12 of the flexible conveyor units 14 of the flexible conveyor system 10. The power unit 12 further includes an idler roller assembly 54 which is centrally disposed longitudinally of the power unit 12 and a pair of powered roller assemblies 56 which are mounted at the opposite ends of the power unit 12, respectively.

The flexible conveyor units 14 of the flexible conveyor system 10 are illustrated in FIGS. 5, 6 and 7. Referring first to FIG. 5, each flexible conveyor unit 14 includes a frame 58 comprising a flexible support 60 formed from sheet steel or the like and extending the entire length of the frame 58. One end of the frame 58 of each flexible conveyor unit 14 is supported on a pair of wheels 62. Interconnecting hinge members 64 are mounted at the opposite ends of the frame 58 and are utilized to connect the flexible conveyor units 14 to the power unit 12 and to the remaining flexible conveyor units 14 comprising the flexible conveyor system 10. By means of the interconnecting hinge members 64, the flexible conveyor system 10 is adapted for use in transporting articles over conveyor courses including inclined portions, such as a gangway extending from a warehouse into a semitrailer, and the like.

Each flexible conveyor unit 14 of the flexible conveyor system 10 further comprises a plurality of idler roller assemblies 66 and a plurality of powered roller assemblies 68. In the embodiment of the invention illustrated in the Drawings the idler roller assemblies 66 and the powered roller assemblies 68 are alternately arranged longitudinally of the flexible conveyor unit 14. It will be understood, however, that additional idler roller assemblies 66 may be provided between the powered roller assemblies 68, if desired. The latter embodiments of the invention are particularly useful in conveying small articles and in conveying sacked and bagged products, such as meal, etc.

The idler roller assemblies 66 and the powered roller assemblies 68 are supported on laterally extending portions 70 of the frame 58 of the flexible conveyor unit 14. Since the frame 58 comprises the flexible support 60, each flexible conveyor unit 14 is adapted for flexure in a plane extending longitudinally of the unit and perpendicular to the flexible support 60. To this end, sash chains 72 are connected between each laterally extending portion 70 of the frame 58 to limit the radius of curvature of the flexible conveyor unit 14 to approximately 36 inches. It will be appreciated that bumper blocks can be used for this purpose in lieu of the sash chains 72, if desired.

Referring now to FIG. 6, the structural details of the idler roller assemblies 66 of the flexible conveyor units 14 are shown. Each idler roller assembly 66 comprises a shaft 74 which is supported at its opposite ends by one of the laterally extending portions 70 of the frame 58. The shaft 74 in turn supports a plurality of spaced, heavy duty ball bearing idler rollers 76. The spaced idler roller construction illustrated in FIG. 6 is utilized in the preferred embodiment in order to accommodate movement of packages and similar articles around curved portions of the conveyor course. It will be understood, however, that the spaced idler rollers 76 may be replaced with a single idler roller, if desired.

The construction of the powered roller assemblies 68 of the flexible conveyor units 14 is also illustrated in FIG. 6. Each powered roller assembly 68 comprises a shaft 78 which is supported in U-shaped journals 80 formed in the appropriate laterally extending portions 70 of the frame 58 of the flexible conveyor unit 14. A single ball bearing roller 82 extending substantially the entire width of the flexible conveyor system 10 is in turn rotatably supported on the shaft 78. Each roller 82 comprises twin relatively large diameter portions 84 extending substantially the entire width of the roller and a centrally disposed reduced diameter portion 86.

Each flexible conveyor unit 14 further comprises an elongate flexible drive shaft 90 which extends the entire length of the unit. The opposite ends of each flexible drive shaft 90 are equipped with connectors 52' adapted to form driving connections with the connectors 52 of the power unit 12 and with the connectors 52' of the other flexible units 14. By this means the flexible drive shafts 90 function to transfer operating power from the power unit 12 throughout the length of the flexible conveyor system 10.

The flexible drive shaft 90 of each flexible conveyor unit 14 supports a plurality of sheave members 92. Each sheave member 92 is positioned directly under one of the powered roller assemblies 68 and comprises a cylindrical portion 94 and a pair of opposed conical portions 96 which taper inwardly from the cylindrical portion 94 toward the drive shaft 90. A wide, flat belt 98 extends around each of the sheave members 92 and around the reduced diameter portion 86 of the adjacent roller 82. The belts 98 function to drivingly interconnect the flexible drive shaft 90 and the powered roller assemblies 68, whereby upon rotation of the drive shafts 90 under the action of the prime mover 24 of the power unit 12, the rollers 82 are rotated and thereby function to convey articles along the length of the flexible conveyor system 10.

In the use of the present invention, it has been found that the flat belts 98 ride on one of the conical portions 96 of the sheave members 92 depending on the direction of rotation of the flexible drive shaft 90. This is highly advantageous in that the belts 98 exhibit considerably less tendancy to bind when engaged with a conical surface, and belt wear is therefore markedly reduced when sheave members incorporating the present invention are used. It will thus be understood that the cylindrical portions 94 of the sheave members 92 do not normally engage the flat belts 98. Rather, the cylindrical portions 94 serve to interconnect the conical portions 96 and to permit the belts 98 to move from one conical portion to the other whenever the direction of rotation of the flexible shafts 90 is reversed.

Referring now to FIG. 7, it will be seen that the thickness of the belts 98 is substantially equal to the difference in diameter between the large diameter portions 84 and the reduced diameter portions 96 of the rollers 82. Thus, the outer surfaces of the belts 98 function as extensions of the large diameter portions 84 of the rollers 82 to provide an article engaging surface of uniform height extending to substantially the entire width of the rollers 82. This also results in a uniform linear velocity across the entire width of the rollers 82, whereby any tendency for articles transported by the flexible conveyor system 10 to twist or turn as they are conveyed over the conveyors is completely eliminated.

FIG. 7 further illustrates the manner in which each flexible drive shaft 90 is aligned. Each flexible conveyor unit 14 is provided with a plurality of hook-shaped bearing members 100. As best shown in FIGS. 5 and 6, the hook-shaped bearing members 100 comprising each set are mounted on opposite sides of each sheave member 92 on the flexible drive shaft 90. Referring again to FIG. 7, the upper ends of the hook-shaped bearing members 100 comprise downwardly facing locating surfaces 102 which may be coated with a layer of bearing material 102', if desired.

As has been indicated previously, the shaft 78 of each powered roller assembly 68 is received in a U-shaped journal 80 formed in the laterally extending portion 70 of the frame 58 of the flexible conveyor unit 14. The shaft 78 supports the roller 82, and the wide, flat belt 98 extends around the roller 82 and the adjacent sheave member 92. Thus, the tension of the belt 98 imposes an upwardly directed force on the sheave member 92. This force is opposed by the hook-shaped bearing members 100, whereby the flexible drive shaft 90 is precisely located by the cooperation of the hook-shaped bearing members 100 and the U-shaped journal 80 formed in the laterally extending portions 70. This construction has been found to be highly advantageous in that whenever it becomes necessary to replace the belts 98, both the rollers 82 and the flexible drive shaft 90 are quickly and easily disengaged from their respective locating structures, whereupon the belts 98 are quickly and easily replaced.

Referring again to FIGS. 2, 3 and 4, the idler roller assembly 54 of the power unit 12 is constructed substantially identically to the idler roller assemblies 66 of the flexible conveyor units 14. Thus, the idler roller assembly 54 comprises a shaft 110 which is supported in the upper portion 20 of the frame 16 and a plurality of heavy duty ball-bearing rollers 112 supported on the shaft for independent rotation with respect thereto. In a similar manner, the powered roller assemblies 56 of the power unit 12 are constructed substantially identically to the powered roller assemblies 68 of the flexible conveyor unit 14. Thus, each powered roller assembly 56 comprises a shaft 114 which is supported in a U-shaped journal 116 formed in the upper portion 20 of the frame 16. The shaft 114 supports a ball-bearing roller 118 having large diameter portions 120 extending substantially the entire width of the power unit 12 and a centrally disposed reduced diameter portion 122. A wide, flat belt 124 extends around the reduced diameter portion 122 and around a sheave member 126 constructed substantially identically to the sheave members 92 utilized in the flexible conveyor units 14. By this means the rollers 118 are drivingly connected to the drive shaft 48 for rotation thereby.

In the use of the invention, one or more flexible conveyor units 14 are connected to the power unit 12 on the side thereof to form a flexible conveyor 10 having the length required for a particular application. It has been found that the construction illustrated in the Drawings is readily adapted to form flexible conveyor systems having lengths up to fifty feet. The power unit 12 is preferably centrally disposed relative to the flexible conveyor units 14 comprising the flexible conveyor system. This is because central positioning of the power unit 12 reduces by a factor of approximately one-half the power transmission requirements of the system from that which would be necessary if the power unit 12 were to be positioned at one end of the system.

After the flexible conveyor system 10 has been formed by adjoining flexible conveyor units 14 one to another and to the power unit 12, the flexible conveyor system 10 is disposed along any particular course that may be required by the particular application. As has been indicated above, the flexible construction of the flexible conveyor units 14 permits the conveyor course to follow a curved orientation so long as the radius of curvature is not less than 36 inches. Of course, any possibility of drawing the conveyor system into too tight a radius is eliminated by the chain 72 extending between the laterally extending portions 70 of the flexible conveyor units 14. It should be further noted that the interlocking hinge assemblies 64 which join the flexible conveyor units 14 one to another and to the power unit 12 permit the flexible conveyor system to be utilized over an inclined or over a partially inclined conveyor course.

After the flexible conveyor system 10 is properly positioned, the prime mover 24 is actuated. In the case of a prime mover comprising an electric motor, a switch 128 may be provided for controlling both the speed and direction of operation of the prime mover. In the case of a prime mover comprising an internal combustion engine, conventional transmission apparatus may be provided for controlling the speed and the direction of the output thereof. It will be understood that the prime mover 24 may be adapted for control from either or both ends of the flexible conveyor system 10, if desired.

Upon actuation, the prime mover 24 operates through the speed reducer system 28 and the slip clutch 46 to rotate the drive shaft 48. The drive shaft 48 in turn operates through the connectors 52–52' to actuate the flexible drive shafts 90 of the various flexible conveyor units 14 comprising the flexible conveyor system 10. The drive shafts 90 in turn operate through the sheave members and the wide, flat drive belts to rotate the powered roller assemblies comprising the flexible conveyor system 10. Upon rotation, the powered roller assemblies function to transport packages and similar articles from one end of the conveyor course to the other.

It will thus be understood then that in accordance with the present invention there is provided a flexible conveyor system comprising many advantageous characteristics that adapt the system to use in numerous industrial and commercial applications. Conveyor systems incorporating the invention are economical to manufacture and use, and yet are suitable for long-term, maintenance-free operation. Systems utilizing the invention are further advantageous in that articles may be transported over conveyor courses extending around curves and other inclined portions. Other advantages deriving from the use of the invention will immediately suggest themselves to those skilled in the art.

Although specific embodiments of the invention have been illustrated in the Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A flexible conveyor system comprising:
   a plurality of spaced, substantially horizontally disposed rollers;
   flexible sheet means supporting the rollers and extending generally perpendicularly with respect thereto whereby the rollers are adapted for positioning along a predetermined curved course upon flexure of the flexible sheet means;
   flexible drive shaft means supported on the flexible sheet means beneath the rollers for rotation about an axis extending longitudinally with respect to the flexible sheet means and drivingly interconnected to each of the rollers; and
   a prime mover drivingly connected to the flexible drive shaft means for actuating the rollers to transport articles along the course.

2. The flexible conveyor system according to claim 1 further comprising a plurality of idler rollers each supported on the flexible sheet means between two of the powered rollers.

3. The flexible conveyor system according to claim 1 further characterized by:
   a centrally located power unit including said prime mover and a drive shaft operably connected to the prime mover for rotation thereby;
   flexible conveyor units extending in opposite directions from the power unit and each comprising said flexible sheet means, rollers supported on the flexible sheet means, and a flexible drive shaft drivingly interconnecting the drive shaft of the power unit and the rollers of the flexible conveyor unit; and
   wherein the flexible conveyor units are each hingedly connected to the power unit and to each other.

4. In a conveyor system of the type including a plurality of rollers mounted at spaced points along a course and a drive shaft extending beneath and generally perpendicularly to the rollers for supplying operating power to the rollers and thereby transporting articles along the course on the rollers, the improvement comprising:
   a plurality of sheave members mounted on the drive shaft at points corresponding to the positioning of the rollers, each sheave member including a central cylindrical portion and opposed inwardly tapered conical portions at the opposite ends of the central cylindrical portion; and
   a plurality of wise, flat belts each forming a driving connection between one of the sheave members and one of the rollers comprising the conveyor,
   each of said belts engaging one of the conical portions of its respective sheave member in accordance with the direction of rotation of the drive shaft.

5. The conveyor system according to claim 4 wherein each roller of the conveyor comprises an elongate, relatively large diameter portion having a substantially uniform diameter throughout its length and a reduced diameter portion having the belt mounted therein, said reduction in diameter being substantially equal to the thickness of the belt whereby the belt cooperates with the remainder of the roller to provide a substantially continuous article engaging surface.

6. The conveyor system according to claim 4 wherein the belts each impose an upwardly directed force on the drive shaft and further including a plurality of downwardly facing hook-shaped bearing members each engaging the drive shaft at a point adjacent one of the sheave members for locating the drive shaft against the action of the upwardly directed force imposed by the belts.

7. The conveyor system according to claim 6 wherein each of the rollers comprising the conveyor is supported at its opposite ends in a pair of upwardly facing U-shaped journal members whereby the drive belts interconnecting the drive shaft and the rollers of the conveyor may be readily replaced in the event of failure.

8. In a conveyor system of the type comprising a plurality of rollers mounted on spaced points along a course, a drive shaft extending generally perpendicularly to the rollers for supplying operating power thereto whereby articles are transported along the course on the rollers, and a plurality of drive belts each forming a driving connection between the drive shaft and one of the rollers, the improvement comprising:
   a plurality of upwardly facing U-shaped journal means each for receiving and rotatably supporting one of the rollers comprising the conveyor; and
   a plurality of downwardly facing hook-shaped bearing members for receiving and locating the drive shaft under the action of the tension applied thereto by the drive belts.

9. The conveyor system according to claim 8 wherein the hook-shaped bearing members are arranged in sets each including a pair of hook-shaped bearing members positioned on opposite sides of one of the drive belts.

10. The conveyor system according to claim 9 further comprising a plurality of sheave members mounted on the drive shaft at points corresponding to the positioning of the rollers, each sheave member including a central cylindrical portion of substantially larger diameter than the drive shaft and a pair of conical members extending from the opposite ends of the cylindrical portion and tapering inwardly therefrom to the drive shaft, whereby the drive belt rides on one of the conical por- 11. A flexible conveyor system comprising:
flexible sheet means oriented substantially vertically;
a plurality of substantially horizontally disposed rollers supported by the flexible sheet whereby the sheet means is adapted for flexure to support the rollers along a predetermined curved course;
flexible drive shaft means extending along the flexible sheet means and supported for rotation with respect thereto; and
belt means drivingly interconnecting the flexible drive shaft and the rollers for actuating the rollers to convey articles along the course.

12. The flexible conveyor system according to claim 11 further characterized by:
a reduced diameter portion formed in each of the rollers for receiving the belt means;
the difference in diameter between the reduced diameter portion and the remainder of the roller being substantially equal to the thickness of the belt means; and
a plurality of sheave members mounted on the flexible drive shaft means at points corresponding to the positioning of the rollers,
each of said sheave members comprising a central cylindrical portion and outer conical portions which taper inwardly from the cylindrical portion toward the drive shaft,
each of said sheave members receiving one of the belt means whereby said belt means engages one of the conical portions of its respective sheave member in accordance with the direction of rotation of the flexible drive shaft means.

13. The flexible conveyor system according to claim 12 further comprising hook-shaped bearing meeans receiving the flexible drive shaft means adjacent each of the sheave members thereon for locating the flexible drive shaft means against the action of the tension in the belt means.

14. A flexible conveyor system comprising:
a central power unit including:
a frame supported on wheels;
a prime mover mounted on the frame; and
drive shaft means supported on the frame and operatively connected to the prime mover for rotation thereby; and
a pair of flexible conveyor units extending in opposite directions from the power unit and each including:

a frame supported on wheels and comprising a substantially vertically extending flexible sheet;
a plurality of substantially horizontally disposed rollers mounted at spaced points along the frame; and
flexible drive shaft means extending along the frame and forming a driving connection between the drive shaft of the power unit and to the rollers of the flexible conveyor unit,
whereby the flexible conveyor units are adapted for flexure to position the rollers along a curved course and the power unit is thereafter adapted to operate the rollers to transport articles along the course.

15. The flexible conveyor system according to claim 14 wherein the central power unit further comprises at least one roller positioned in alignment with the rollers of the flexible conveyor units and means drivingly interconnecting the roller of the central power unit and the drive shaft of the central power unit.

16. The flexible conveyor system according to claim 14 wherein the flexible drive shaft of each flexible conveyor unit is drivingly connected to each roller of the flexible conveyor unit by a driving connection including:
a sheave member mounted on the flexible drive shaft in alignment with the roller and comprising a central cylindrical portion and inwardly tapered conical portions extending in opposite directions from the cylindrical portion; and
a wide, flat belt extending around the roller and around the sheave member to drivingly interconnect the drive shaft and the roller, said belt engaging one of the conical portions of the sheave member in accordance with the direction of rotation of the drive shaft.

17. The flexible conveyor system according to claim 16 further comprising a plurality of downwardly facing hook-shaped bearing members each engaging the flexible drive shaft of one of the flexible conveyor units at a point adjacent one of the sheave members on the drive shaft to locate the flexible drive shaft against the action of the tension of the corresponding drive belt.

18. The flexible conveyor system according to claim 14 further including means hingedly interconnecting the central power unit and the flexible conveyor units whereby the system is adapted to convey articles over a course including an inclined portion.

19. A flexible conveyor system comprising:
a central power unit including:
a prime mover;
speed reducer means driven by the prime mover;
slip clutch means driven by the speed reducer means;
drive shaft means driven by the slip clutch means; and
at least one substantially horizontally disposed roller drivingly connected to the drive shaft means; and
a plurality of flexible conveyor units extending in opposite directions from the power unit and each including:
substantially vertically extending flexible sheet means;
a plurality of substantially horizontally disposed rollers mounted at spaced intervals along the flexible sheet means;
flexible drive shaft means operatively connected to the drive shaft means of the central power unit and extending along the flexible sheet means;
a plurality of sheave members mounted on the flexible drive shaft at point corresponding to the positioning of the rollers and each comprising a central cylindrical portion and opposed, inwardly tapered conical portions; and
a plurality of wide, flat belts each extending around one of the sheave members and one of the rollers and thereby forming a driving connection between the flexible drive shaft in the roller,
whereby the flexible conveyor units are adapted for flexure in a generally horizontal plane to position the rollers along a curved course and the power unit is adapted to operate the rollers to transport articles along the course.

20. The flexible conveyor system according to claim 19 wherein the central power unit includes a frame which supports the remaining components thereof and further comprising means hingedly interconnecting the flexible sheet means of the flexible conveyor units and the frame of the central power unit and thereby adapting the system to transport articles over a course including an inclined portion.

* * * * *